March 14, 1950 G. O. HOFFSTETTER 2,500,682
ADJUSTABLE SHIELD
Filed Aug. 2, 1946
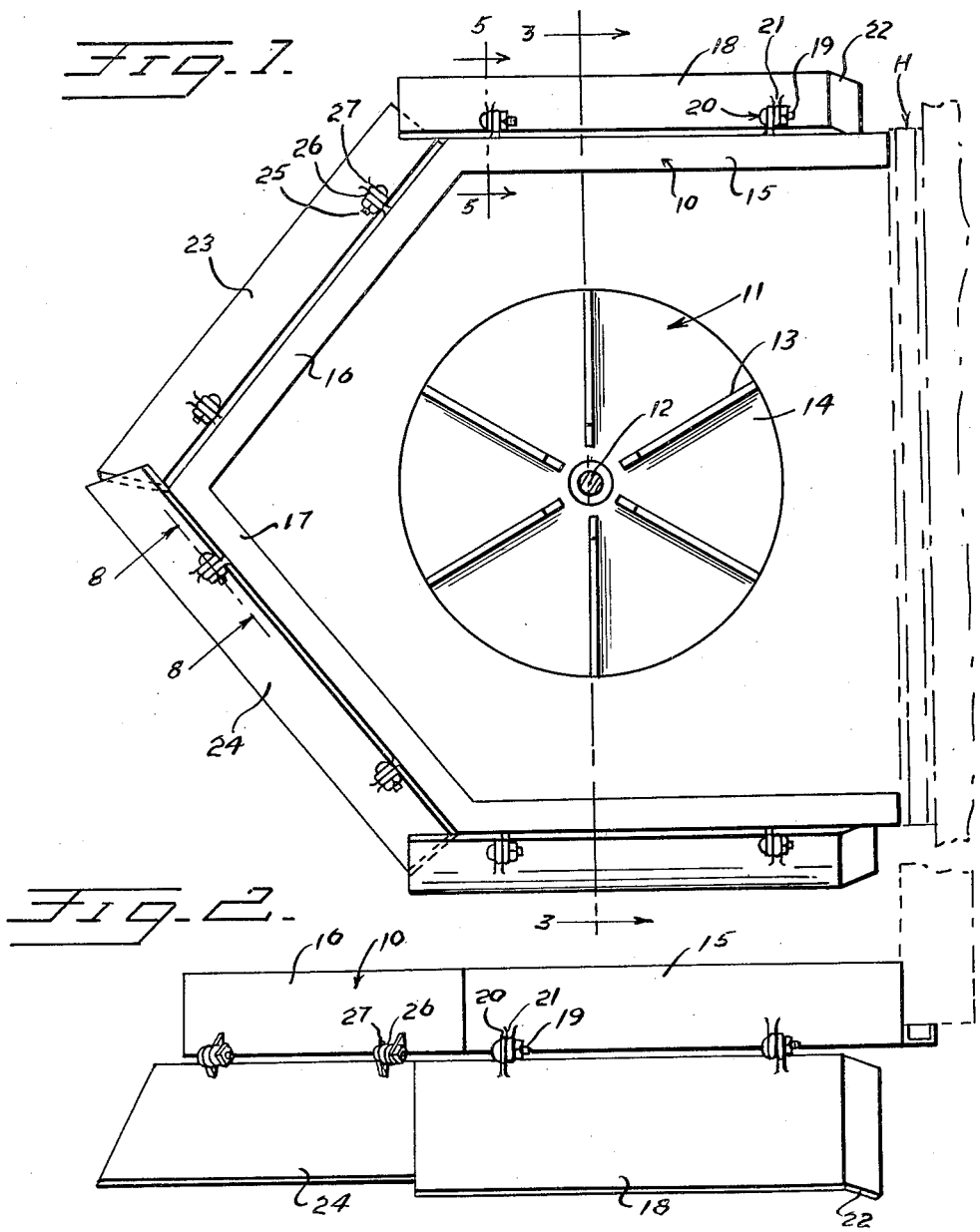
Inventor
G. O. Hoffstetter
By Kimmel & Crowell
Attorneys March 14, 1950 G. O. HOFFSTETTER 2,500,682
ADJUSTABLE SHIELD
Filed Aug. 2, 1946 2 Sheets-Sheet 2
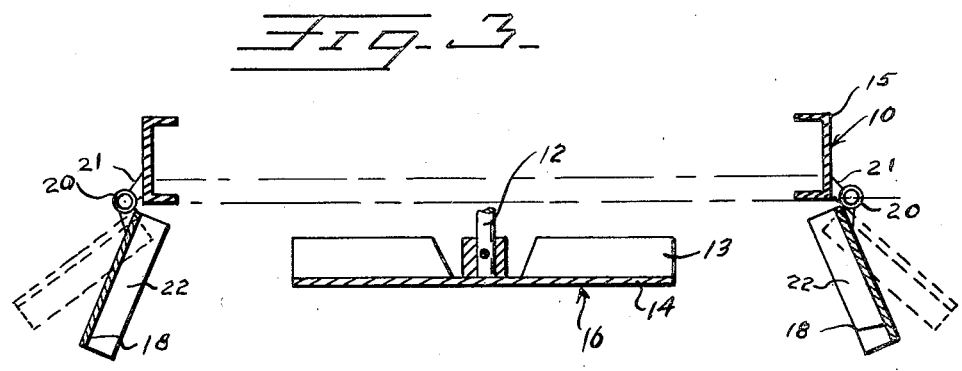
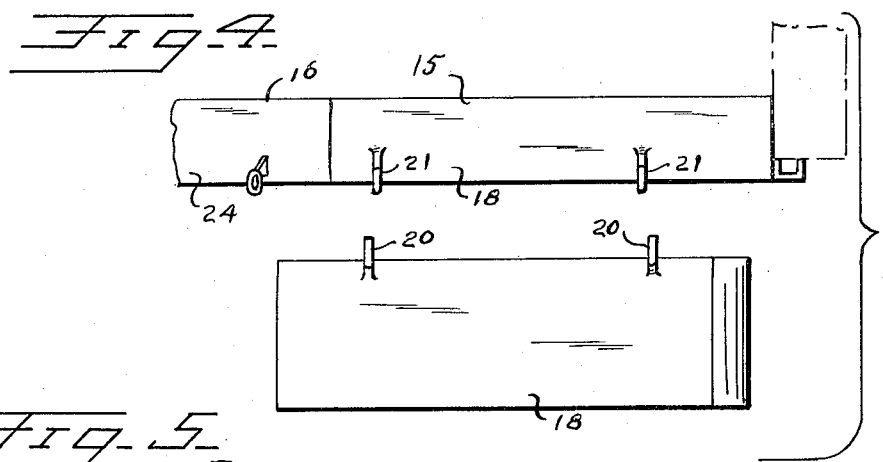
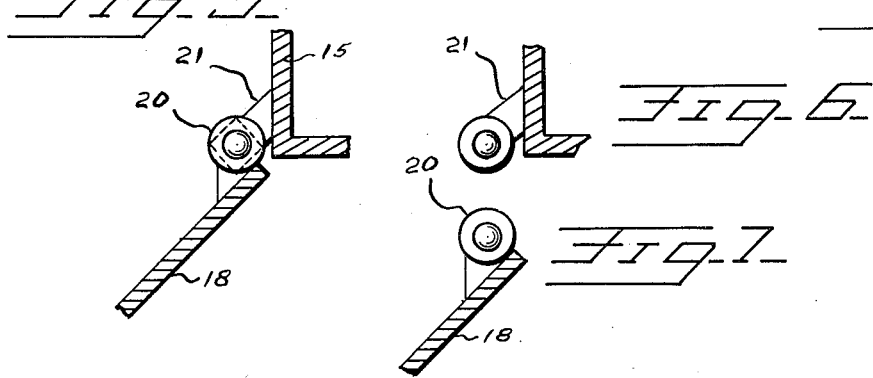
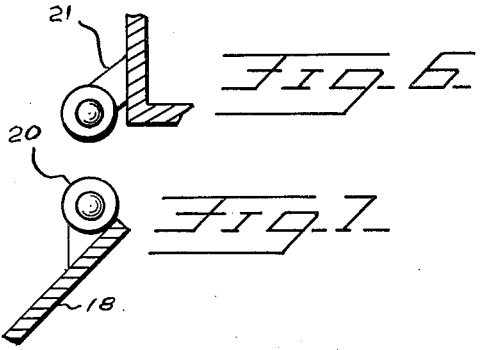
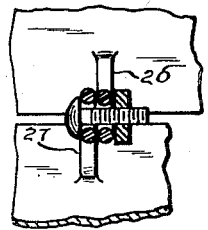
Inventor
G. O. Hoffstetter
By Kimmel & Crowell
Attorneys Patented Mar. 14, 1950

2,500,682

UNITED STATES PATENT OFFICE 2,500,682

ADJUSTABLE SHIELD

George O. Hoffstetter, Jerseyville, Ill.

Application August 2, 1946, Serial No. 687,825

1 Claim. (Cl. 275—8)

This invention relates to fertilizer spreaders.

In the use of fertilizer spreaders of the rotary type which broadcast the material over the ground, the material is scattered over a relatively wide area. It is, therefore, an object of this invention to provide means in the form of an attachment by which the area to be covered by the material may be regulated so that a definite quantity of material may be laid on the surface of the ground.

Another object of this invention is to provide in combination with a rotary broadcaster, a shield positioned about the broadcaster for confining the area of distribution.

Another object of this invention is to provide a device of this kind which is adjustable so that the area of distribution of the material can be determined to a fairly definite degree.

A further object of this invention is to provide a device of this kind which is of simple construction so that it can be used with known types of rotary broadcasters.

With the above and other objects in view, my invention consists in the arrangement, combination and details of construction disclosed in the drawings and specification, and then more particularly pointed out in the appended claim.

In the drawings,

Figure 1 is a detail top plan of a shield constructed according to an embodiment of this invention, disposed about a rotary broadcaster, partly shown in section, Figure 2 is a detail side elevation of the device, Figure 3 is a sectional view taken on the line 3—3 of Figure 1, Figure 4 is a fragmentary exploded view of the shield and support, Figure 5 is a sectional view taken on the line 5—5 of Figure 1, Figure 6 is a fragmentary sectional view of the stationary support for the shield, Figure 7 is a fragmentary sectional view of one of the shields, Figure 8 is a fragmentary sectional view taken on the line 8—8 of Figure 1.

Referring to the drawings, the numeral 10 designates generally a semi-hexagonal frame or support which is adapted to be fixed to the rear end of a hopper H. The hopper H has associated therewith a rotary broadcaster or spreader 11 which is carried by a shaft 12. The spreader 11 includes spreader blades extending radially from the center of the disc 14.

The spreader 11 is conventional, and as here shown, is one type of spreader with which this invention may be associated. The supporting frame 10 includes parallel side members 15 and rearwardly convergent members 16, 17. The rearwardly convergent members 16, 17 may be formed integral with the side members 15, and the frame 10 as shown in Figure 3, may be of channel-shape in transverse section.

In order to provide a means whereby the material which is thrown outwardly by the rotary spreader 11 may be confined to a predetermined area at the rear of the hopper H, I have provided adjustable shields. A pair of side shields 18 are disposed in depending relation to each side member 15, and the side shields 18 are adjusted relative to the vertical by means of adjusting bolts 19. The side members 15 have fixed thereto a pair of eyes 20 and the shields 18 have fixed thereto complementary eyes 21.

The bolts 19 extend through complementary eyes 20 and 21 and when tightened will firmly hold the side shields 18 in selected angular position with respect to the vertical. The forward ends of the shields 18 are bent inwardly as indicated at 22, so as to prevent any material from being thrown outwardly between the rear end of the hopper H and the forward ends of the side shields 18.

The rear convergent frame members 16, 17 also have adjustably secured thereto rear shields 23, 24. The shields 23, 24 are of like construction, being in the form of elongated flat plates, and these shields are adjustably secured to the rear frame members 16, 17 by means of bolts 25, engaging through eyes 26 fixed to the frame members 16, 17, and also through eyes 27 which are fixed to the shields 23, 24. The rear ends of the shields 23, 24 slightly overlap each other and the forward outer ends of the shields 23, 24 may underlap the rear ends of the side shields 18.

In the use of this shield structure, the shield members 18, 23, 24, are secured to the supporting frame 10, and as shown in Figure 3, may be adjusted relative to the vertical to any selected position for confining the broadcast material which is broadcast by spreader 11 to a predetermined area. The supporting frame 10 is substantially larger than the diameter of the spreader 11 and this spreader is positioned adjacent the upper edge portions of the shield members. As the spreader 11 rotates, the material is forced outwardly and this material will then strike the inclined shields and will be directed downwardly and outwardly. The inclination of the shields will determine the area of spreading of the material.

The material which is being spread or broadcast may be a fertilizer, cinders, crushed rock, sand, salt, or other granular or powdered material to be spread over the surface of the ground.

What I claim is:

The combination with a rotary broadcaster of a shield spaced about said broadcaster, said shield comprising a frame having spaced apart side members and convergent rear members, said frame being disposed in a plane parallel to and above that of the rotary broadcaster, a plate depending hingedly from each of said side members and said rear members and adapted to provide a side wall about said rotary broadcaster, the bottom edges of said plates being adapted to be swung outwardly to incline said side wall relative to the vertical, the adjacent ends of said plates overlapping to close the spaces therebetween, and means engaging said side members and rear members and the associated plates and adapted to maintain said plates in the selected outwardly swung position whereby said plates will deflect downwardly material thrown off said broadcaster to restrict the range thereof.

GEORGE O. HOFFSTETTER.

REFERENCES CITED

The following references are of record in the file of this patent:

UNITED STATES PATENTS

| Number | Name | Date |
|---|---|---|
| 1,508,210 | Bangert | Sept. 9, 1924 |
| 1,625,353 | Dugan | Apr. 19, 1927 |
| 2,044,652 | Walker | June 16, 1936 |
| 2,418,546 | Comtois | Apr. 8, 1947 |